United States Patent
Kotani et al.

(10) Patent No.: US 8,726,335 B2
(45) Date of Patent: *May 13, 2014

(54) CONSIGNING AUTHENTICATION METHOD

(75) Inventors: Seigo Kotani, Sunnyvale, CA (US); Masaaski Matsuguchi, Kanagawa (JP)

(73) Assignee: Fujitsu Limited, Kawasaki-shi (JP)

( * ) Notice: Subject to any disclaimer, the term of this patent is extended or adjusted under 35 U.S.C. 154(b) by 560 days.

This patent is subject to a terminal disclaimer.

(21) Appl. No.: 12/824,275

(22) Filed: Jun. 28, 2010

(65) Prior Publication Data

US 2011/0321119 A1   Dec. 29, 2011

(51) Int. Cl.
*G06F 17/00* (2006.01)
*H04L 29/06* (2006.01)
*G06F 21/60* (2013.01)

(52) U.S. Cl.
CPC .......... *H04L 63/0861* (2013.01); *H04L 63/107* (2013.01); *G06F 21/606* (2013.01); *G06F 2221/2113* (2013.01)
USPC ................................................. 726/1; 726/25

(58) Field of Classification Search
CPC .............. H04L 63/0861; H04L 63/107; H04L 63/0876; H04L 63/102; G06F 21/00; G06F 21/606; G06F 2221/2113; G06F 2221/2141; G06F 221/2145
USPC ........................................ 726/1, 25; 709/217
See application file for complete search history.

(56) References Cited

U.S. PATENT DOCUMENTS

| | | | |
|---|---|---|---|
| 7,461,071 B2 * | 12/2008 | Fitzpatrick et al. | 1/1 |
| 8,166,564 B2 * | 4/2012 | Nomura | 726/27 |
| 2004/0117818 A1 * | 6/2004 | Karaoguz et al. | 725/31 |
| 2007/0174141 A1 * | 7/2007 | Suda et al. | 705/27 |
| 2008/0028072 A1 * | 1/2008 | Milojicic | 709/225 |
| 2008/0109910 A1 * | 5/2008 | Day et al. | 726/27 |
| 2008/0301436 A1 * | 12/2008 | Yao et al. | 713/155 |

FOREIGN PATENT DOCUMENTS

| | | | | |
|---|---|---|---|---|
| WO | WO 03/040898 | | 5/2003 | ................ G06F 1/00 |
| WO | WO 03040898 A1 * | 5/2003 | |
| WO | WO 2009/021200 | | 2/2009 | .............. G06F 15/16 |

OTHER PUBLICATIONS

International Search Report and Written Opinion; PCT/IB2011/001432; pp. 10, Dec. 20, 2011.

* cited by examiner

*Primary Examiner* — Samson Lemma

(74) *Attorney, Agent, or Firm* — Baker Botts L.L.P.

(57) ABSTRACT

A method for sharing content between clients at a common trust level in a trust hierarchy associated with a network implementing policy-based management includes making a first request for delivery of content, receiving the requested electronic content, receiving a second request for delivery of the electronic content, communicating the second request, receiving a decision, and delivering the electronic content if the second request is granted. The first request is made to a policy enforcement point in the network for delivery of content to a first client, and includes a trust level of the first client. The second request is for delivery of the content to a second client at the trust level of the first client and includes integrity information about the second client, and is communicated to the policy enforcement point. If the second request is granted, the content is delivered from the first client to the second client.

21 Claims, 4 Drawing Sheets

CONSIGNING AUTHENTICATION METHOD

TECHNICAL FIELD OF THE INVENTION

The present invention relates generally to consigning authentication methods in a distributed communication network, and more particularly to a method and system for sharing content between entities at similar trust levels in a trust hierarchy.

BACKGROUND

Distributed communication networks include a wide range of systems, from private intranets to the unsecured Internet. In any communication network, electronic content flows from one point in the network to another. Electronic content, in this context, may include electronic documents, executable files, data files, etc. In some communication networks, access to the electronic content may be restricted and/or limited to particular users and/or clients. Several methods exist to verify the identity of a user attempting to gain access to electronic content, such as username and password combinations, public/private key combinations, and/or biometrics. In some networks, a central server may employ such methods before distributing electronic content to a requesting user and/or client.

No matter how robust the verification scheme, however, once the electronic content has passed to the user, the central server may not have control over further dissemination. As more and more electronic content is stored remotely and access to that data through various services becomes increasingly important, it will become correspondingly important to protect access to the content. Methods and systems for checking, authorizing, tracking, and/or tracing content transfer after it leaves the server may prove increasingly valuable.

SUMMARY OF THE DISCLOSURE

The present disclosure provides a method and system for distributing electronic content that substantially eliminates or reduces at least some of the disadvantages and problems associated with previous methods and systems.

According to one embodiment, a method for sharing content between clients at a common trust level in a trust hierarchy associated with a network implementing policy-based management may include receiving a first request for delivery of electronic content, approving the delivery of the electronic content, delivering the electronic content, receiving a second request for delivery of the electronic content, determining whether to allow the second request, and communicating the determination. The first request may be received from a first client and be for delivery of the electronic content to the first client at a first trust level in the trust hierarchy. The approval of the delivery of content to the first client may be made at a policy enforcement point in the network based at least in part on the first trust level in the trust hierarchy. The second request may be received from the first client asking permission for the first client to deliver the electronic content to a second client at the first trust level in the trust hierarchy. The second request may include integrity information about the second client. Determining whether to allow the first client to deliver the content to the second client may be based at least in part on the integrity information about the second client. Communicating the determination may include granting permission to the first client to deliver the electronic content to the second client.

According to another embodiment, a method for sharing content between clients at a common trust level in a trust hierarchy associated with a network implementing policy-based management may include making a first request for delivery of content, receiving the requested electronic content, receiving a second request for delivery of the electronic content, communicating the second request, receiving a decision regarding the second request, and delivering the electronic content if the second request is granted. The first request may be made to a policy enforcement point in the network for delivery of content to a first client. The first request may include a trust level of the first client. The requested content may be received from the policy enforcement point. The second request may be for delivery of the content to a second client at the trust level of the first client and may include integrity information about the second client. The second request may be communicated to the policy enforcement point. If the second request is granted, the content may be delivered from the first client to the second client.

According to another embodiment, a network system for sharing electronic content among clients at a common trust level in a trust hierarchy, the network system implementing policy-based management may include a plurality of clients, a storage unit, a policy enforcement point, and a policy decision point. Each client may have a respective trust level in the trust hierarchy. The storage unit may be configured to deliver electronic content to the plurality of clients. The policy enforcement point may be in electronic communication with the storage unit and a first one of the plurality of clients. The policy enforcement point may be configured to receive a first request from the first one of the plurality of clients for the delivery of electronic content from the storage unit. The policy decision point may be in electronic communication with the policy enforcement point. The policy decision point may be configured to assess the first one of the plurality of clients including assessing at least the trust level of the first one of the plurality of clients and to grant permission to the policy enforcement point to deliver the content from the storage unit to the first one of the plurality of clients. The policy enforcement point may be further configured to receive from the first one of the plurality of clients a second request for permission to deliver the electronic content to a second one of the plurality of clients, the second request including at least integrity information associated with the first one of the plurality of clients. The policy decision point may be further configured to make a policy-based decision whether to allow the first one of the plurality of clients to deliver the electronic content to the second one of the plurality of clients based at least in part on the integrity information associated with the first one of the plurality of clients.

Technical advantages of certain embodiments of the present disclosure include providing methods for allowing direct transfer of electronic content between clients without connecting both clients to a server. The methods may include checking and/or authorizing the transfer based on characteristics of the respective clients. The methods may include tracking and/or tracing the transfer of electronic content after it has been delivered from the server. Other technical advantages will be readily apparent to one skilled in the art from the following figures, descriptions, and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
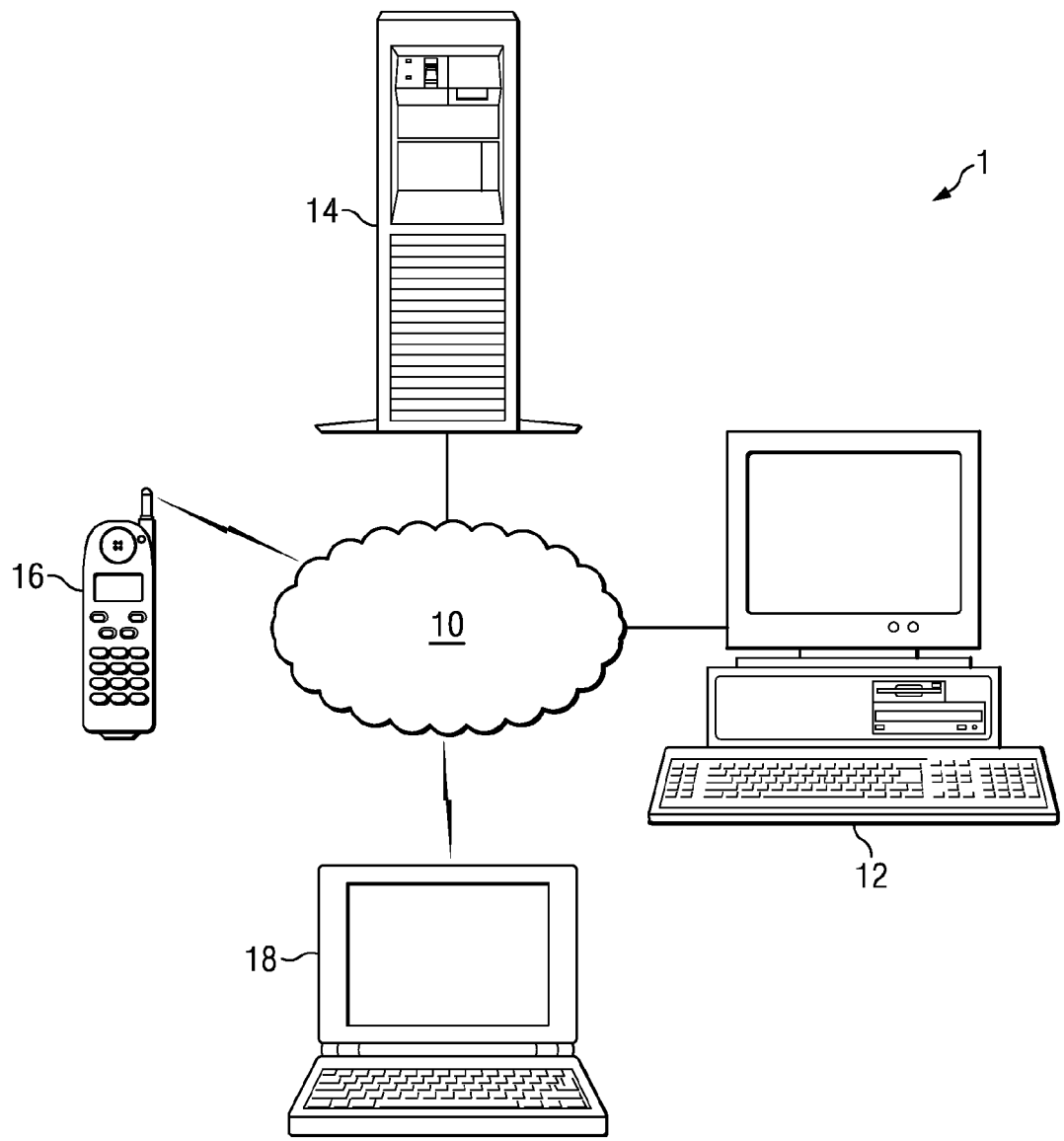
FIG. 1 shows an example communication network including clients and a server, in accordance with teachings of the present disclosure.

Preferred embodiments and their advantages are best understood by reference to FIGS. 1 through 7, wherein like numbers are used to indicate like and corresponding parts. FIG. 1 shows a simplified representation of an example communication network 1, in accordance with the teachings of the present disclosure. Communication network 1 may include a network 10, a server 12, a storage unit 14, and clients 16 and 18. Clients 16 and 18 may include a variety of users requesting access to electronic content accessible by server 12 and/or stored in storage unit 14.

For purposes of this disclosure, "electronic content" or "content" may include any file, files, object code, executable code, data records, or any other electronically recorded data structure that a client of a communication network may wish to access. Illustrative examples may include text files, spreadsheets, email, medical records, images, and other electronic data, as well as web pages, private networks, word processing programs, file management systems, and other programs. Additionally, a "client" may refer to a person acting as an end user or to the device or devices used by such a person to access the communication network, such as a personal computer, kiosk, or mobile computing device.

As illustrated, network 10 may include any network capable of transmitting audio and/or video telecommunication signals, data, and/or messages. Some examples may include all, or a portion of, a radio access network, a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any combination of the preceding.

In operation, network 10 may provide connectivity between components coupled to network 10 using any appropriate communication protocol. To facilitate the described communication capabilities, network 10 may include routers, hubs, switches, gateways, call controllers, and/or any other suitable components in any suitable form or arrangement. Additionally, network 10 may include any hardware and/or software configured to communicate information in the form of packets, cells, frames, segments or other portions of data. Although network 10 is illustrated as a single network, communication network 10 may comprise any number or configuration of networks. Moreover, certain embodiments of communication network 1 may include any number or configuration of network 10.

In some embodiments, network 10 may include a virtual private network (VPN). A VPN provides increased security over an open and/or public network. In general, a VPN segregates and/or encapsulates data transfers so that the data may be kept private and/or secure from other devices sharing a intervening network (e.g., a LAN or a WAN). In operation a VPN may allow a plurality of clients 16, 18 to interact with a server 12 as if connected directly and/or privately.

Clients 16 and 18 may represent any suitable combination of hardware, software, and/or encoded logic to provide communication services to a user. Among other things, clients 16, 18 may represent an information kiosk; telephone; cell phone; personal digital assistant (PDA); computer running telephony, e-mail, or other forms of messaging and/or communication software; or any other communication hardware, software, and/or encoded logic that supports communication of voice, video, text or other forms of data using identity communication network 1.

Server 12 may represent a trusted, dedicated server that manages security policies and authenticates attributes. Server 12 may contain a database containing a number of policies defining a set of attribute values that must be met before a client 16, 18 is granted permission to access a resource of storage unit 14 (e.g., electronic content). Server 12 may receive an attribute report from clients 16, 18 identifying one or more attributes associated with clients 16, 18. After authenticating the attributes, server 12 may notify storage unit 14 whether storage unit 14 should provide the requested service to clients 16, 18. Application of such attribute report and authentication may also be referred to as "policy-based management." In some embodiments, server 12 and/or the associated PDP may make this determination based at least on context data specific to client 16, 18. The context data may include data representative of client 16, 18 such as physical location (e.g., IP address), certain software installed on the requesting machine (e.g., rigorous antivirus software), biometric identifiers, or any other appropriate context attributes of client 16, 18.

In some embodiments, the attributes considered by server 12 may include a trust level indicating the relative trustworthiness of a client 16, 18 in a trust hierarchy. A "trust hierarchy" may refer to a protection scheme to protect data and function of network resources from both faults and malicious behavior. One example of a trust hierarchy may be referred to as "protection rings." In a trust hierarchy, server 12 may provide varying levels of access to various clients 16, 18, depending on the trust level assigned to the respective client 16, 18. A higher trust level, for example, may allow more access to electronic content and/or privileges to upload, edit, and/or control electronic content and/or components of communication network 1. Server 12 may evaluate and/or issue decisions regarding whether to allow a client 16, 18 to access particular electronic content at a policy decision point (PDP). Server 12 may include a policy enforcement point (PEP) which receives a client's access request and enforces any decision made by the PDP.

Storage unit 14 may include any combination of hardware and software, including controlling logic, for providing access to one or more electronic content to a client 16, 18. For example, storage unit 14 may include a centralized repository of documents, such as medical records. As another example, storage unit 14 may represent an application service provider which provides access to particular applications, software or other media over a network. Such applications, software, or media may include, among other things, document readers, web browsers, or document editing software. As another example, storage unit 14 may be associated with an online networking website or an Email provider.

For clarity of description, FIG. 1 depicts server 12 and storage unit 14 as separate components. In some embodiments, server 12 and storage unit 14 may include stand-alone software programs stored on computer-readable media and executable by one or more processors associated with one or more computers and/or servers. However, server 12 and storage unit 14 may also include components or subroutines of a larger software program, hard-coded into computer-readable media, and/or any hardware or software modules configured to perform the desired functions.

Figure 2:
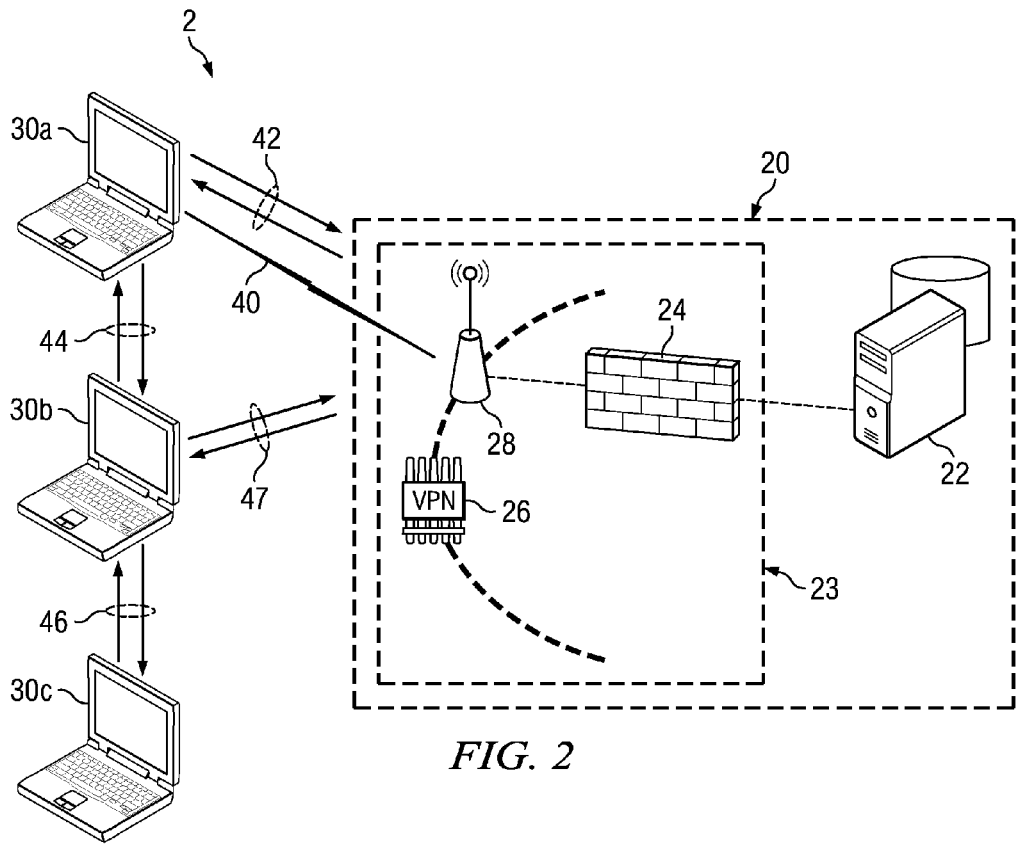
FIG. 2 shows an example communication network, including the flow of information and electronic content, in accordance with teachings of the present disclosure.

FIG. 2 shows an example communication network 2, including the flow of information and electronic content, in accordance with teachings of the present disclosure. Communication network 2 may include server 20, clients 30, and network connection 40. Server 20 may include a policy decision point (PDP) 22 and a policy enforcement point (PEP) 23.

Server 20 may include any device, feature, and/or component of communication network 2 configured to provide services to one or more clients 30. For example, server 20 may communicate with one or more clients 30, store electronic content, and/or distribute electronic content to the one or more clients 30. Server 20 may include any combination of hardware and/or software (e.g., a processor, a memory, and/or other computing resources).

PDP 22 may include any device, feature, and/or component of server 20 configured to evaluate and/or issue decisions regarding whether to allow a client 30 to access particular electronic content. PDP 22 may apply a set of predefined criteria to client 30 to evaluate the decision. PDP 22 may include any combination of hardware and/or software.

PEP 23 may include any device, feature, and/or component of server 20 configured to receive a client's 30 access request and enforce any decision made by the PDP. PEP 23 may include any combination of hardware and/or software. For example, as shown in FIG. 2, PEP 23 may include a firewall 24, a VPN 26, and/or a node 28.

Firewall 24 may include any device, component, and/or feature of server 20 configured to block unauthorized access and permit authorized communications and/or access. Firewall 24 may apply any appropriate set of rules and/or criteria to implement the authorization scheme. Firewall 24 may be implemented in hardware, software, and/or a combination of both. For example, firewall 24 may prevent unauthorized users of the Internet from accessing a private network connected to the Internet. In some embodiments, firewall 24 may apply the decisions made by PDP 22.

Node 28 may include any device, component, and/or feature of PEP 23 configured to provide a connection between server 20 and one or more clients 30. Node 28 may be configured to send, receive, and/or forward data between server 20 and one or more clients 30. For example, node 28 may include a modem, a hub, a bridge, a switch, a host computer, a WLAN access point, etc. Node 28 may be configured to communicate with one or more clients 30 over network connection 40.

Clients 30 may be any suitable combination of hardware, software, and/or encoded logic to provide communication services to a user. For example, client 30 may include an information kiosk, telephone, cell phone, personal digital assistant (PDA), computer running telephony, e-mail, or other forms of messaging and/or communication software, or any other communication hardware, software, and/or encoded logic that supports communication of voice, video, text or other forms of data using communication network 2. In some embodiments, client 30 may include a desktop computer, a portable computer, a notebook computer, and/or a terminal.

In operation, a first client 30*a* may request, purchase, and/or receive delivery of electronic content directly from server 20, shown at arrows 42. A second client 30*b* may require and/or desire the same electronic content previously delivered to the first client 30*a*. Once first client 30*a* has received the requested electronic content, it may be cheaper, quicker, and/or otherwise preferable to distribute the requested electronic content directly from first client 30*a* to second client 30*b* without resending the requested electronic content directly from server 20. Allowing the transmission of the requested electronic content between various clients 30, however, may reduce the security of the electronic content, allow piracy and/or unauthorized access to the electronic content, and/or otherwise compromise the integrity of the electronic content. Direct transfer of requested electronic content may be checked, authorized, tracked, and/or traced using the methods and systems taught in the present disclosure.

As shown in FIG. 2, second client 30*b* may request the electronic content from first client 30*a*, shown at arrows 44. First client 30*a* may be required to receive permission from server 20 to send the requested electronic content to second client 30*b*. First client 30*a* may send a request to PEP 23, including relevant information regarding first client 30*a*, second client 30*b*, or both. PDP 22 may determine whether to allow first client 30*a* to deliver the requested electronic content to second client 30*b*. PDP 22 may consider various information related to second client 30*b* (e.g., integrity information, trust level, etc.). If PDP 22 determines first client 30*a* is allowed to deliver the electronic content directly to second client 30*b*, PEP 23 may communicate that permission to first client 30*a*. First client 30*a* may then deliver the requested electronic content to second client 30*b*.

In another embodiment implementing the teachings of the present disclosure, a third client 30*c* may request the electronic content from second client 30*b*, communicating at arrows 46. Second client 30*b* may request permission from PEP 23 as shown by arrows 47, including relevant information regarding first client 30*a*, second client 30*b*, third client 30*b*, or any combination of the three. PDP 22 may determine whether to allow second client 30*b* to deliver the requested electronic content to third client 30*c*. PDP 22 may consider various information related to third client 30*c* (e.g., integrity information, trust level, etc.). If PDP 22 determines second client 30*b* is allowed to deliver the electronic content directly to third client 30*c*, PEP 23 may communicate that permission to second client 30*b*. Second client 30*b* may then deliver the requested electronic content to third client 30*c*. This method may be replicated in total or in part for as many clients 30 as appropriate.

First client 30*a* may obtain and/or verify integrity information related to second client 30*b* at any point in the processes described herein. In one example embodiment, first client 30*a* may obtain and/or verify integrity information related to second client 30*b* prior to communicating and/or delivering any electronic content and/or other data. First client 30*a* may retain a record of any integrity information obtained and/or verified. Integrity information may be identified by including a timestamp, identifiers for first client 30*a* and/or 30*b*, etc. The integrity information may be referenced by first client 30a and/or server 20 for a variety of purposes. For example, server 20 may request that first client 30a verify that second client 30b was an appropriate recipient of the electronic content, may compile a list of all clients 30 having received the electronic content, etc.

Figure 3:
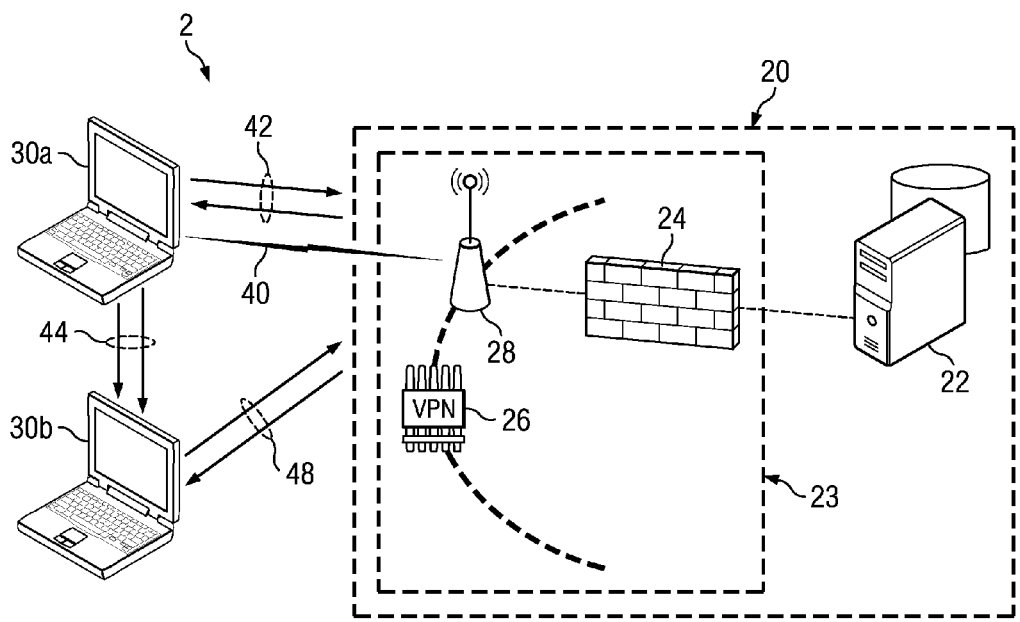
FIG. 3 shows an example communication network, including the flow of information and electronic content, in accordance with teachings of the present disclosure.

FIG. 3 shows another example flow in communication network 2, in accordance with teachings of the present disclosure. Second client 30b may request the electronic content from PEP 23 of server 20, shown at arrows 48. PDP 22 of server 20 may grant second client 30b permission to receive the requested electronic content directly from first client 30a, rather than from server 20. The request sent at 46 may include various data related to first client 30a, second client 30b, or both. PDP 22 may determine whether to allow first client 30a to deliver the requested electronic content to second client 30b. PDP 22 may consider various information related to second client 30b (e.g., integrity information, trust level, etc.). If PDP 22 determines first client 30a is allowed to deliver the electronic content directly to second client 30b, PEP 23 may communicate that permission to first client 30a. First client 30a may then deliver the requested electronic content to second client 30b.

In the schemes shown in FIGS. 2 and 3, PDP 22 may use any appropriate logic, algorithm, and/or routine to make a decision regarding the direct transfer of the requested electronic content between clients 30a and 30b. PDP 22 may consider data representative of clients 30a and 30b such as association with a entity (e.g., a customer), physical location (e.g., IP address), certain software installed on the requesting machine (e.g., required antivirus software), biometric identifiers, or any other appropriate attributes of client 30. The request sent at arrows 44 and/or 46 may include any or all of this data related to first client 30a, second client 30b, or both. In some embodiments, first client 30a and second client 30b may be assigned the same trust level in a trust hierarchy employed by PDP 22.

Figure 4:
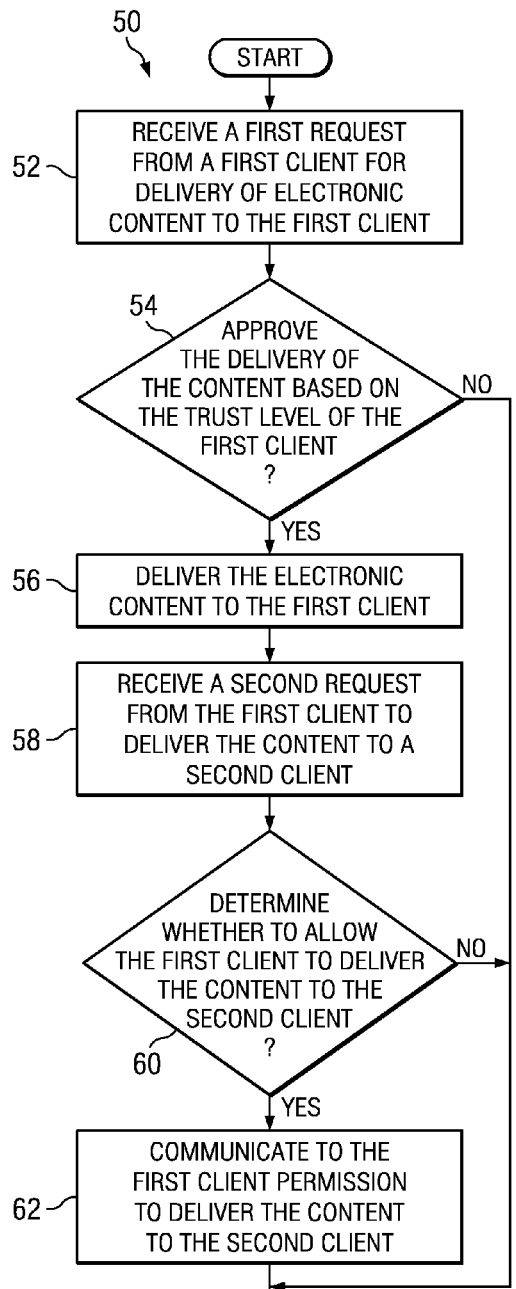
FIG. 4 illustrates a flow chart of an example method for sharing content between clients in a communication network, in accordance with certain embodiments of the present disclosure.

FIG. 4 illustrates a flow chart of an example method 50 for sharing content between clients 30 in a communication network 2, in accordance with certain embodiments of the present disclosure. Method 50 may be performed by a server 20, a PEP 23 associated with a server 20, a PDP 22 associated with a server 20, and/or another component, device, and/or feature of communication network 2. In the following section, method 50 may be described as if performed by PEP 23 and/or PDP 22 associated with server 20, but that description does not limit the application of the teachings of the present disclosure.

At step 52, PEP 23 may receive a first request from a first client 30a for delivery of electronic content to the first client 30a. PEP 23 may receive the first request over a VPN, the Internet, email, and/or any other appropriate communication link with first client 30a.

At step 54, PDP 22 may decide whether to approve the delivery of the electronic content to the first client 30a based at least in part on the trust level associated with the first client 30a. As described above, communication network 2 may include a trust-based hierarchy assigning various trust levels to clients 30, internal users, and/or other components and/or users of communication network 2. If PDP 22 determines that first client 30a is not approved, method 50 may end.

At step 56, PEP 23 may deliver the electronic content to first client 30a based on the permission granted by PDP 22. The electronic content may be delivered by any appropriate method.

At step 58, PEP 23 may receive a second request from first client 30a requesting permission to deliver the electronic content directly from first client 30a to second client 30b. The second request may include any appropriate and/or required data related to first client 30a, second client 30b, or both. As discussed above, the data may include the trust level of each client, integrity information related to either or both, etc.

At step 60, PDP 22 may decide whether to grant permission for first client 30a to deliver the requested electronic content directly to second client 30b. The decision may be based at least in part on the data included in the second request. For example, PDP 22 may base the decision at least in part on the trust level of second client 30b and/or integrity information related to second client 30b. If PDP 22 determines the second request is not approved, method 50 may end.

At step 62, PEP 23 may communicate to first client 30a that first client 30a has permission to deliver the requested electronic content to second client 30b. At the same time, PEP 23 and/or PDP 22 may impose one or more conditions on the delivery of the requested electronic content. For example, the use of the electronic content by second client 30b may be restricted. As another example, second client 30b may be granted a specific and/or limited number of times the electronic content may be accessed. As another example, second client 30b may be granted permission to access the requested electronic content only during a predefined period of time. As another example, second client 30b may be limited and/or prohibited from delivering the requested electronic content to other clients.

Figure 5:
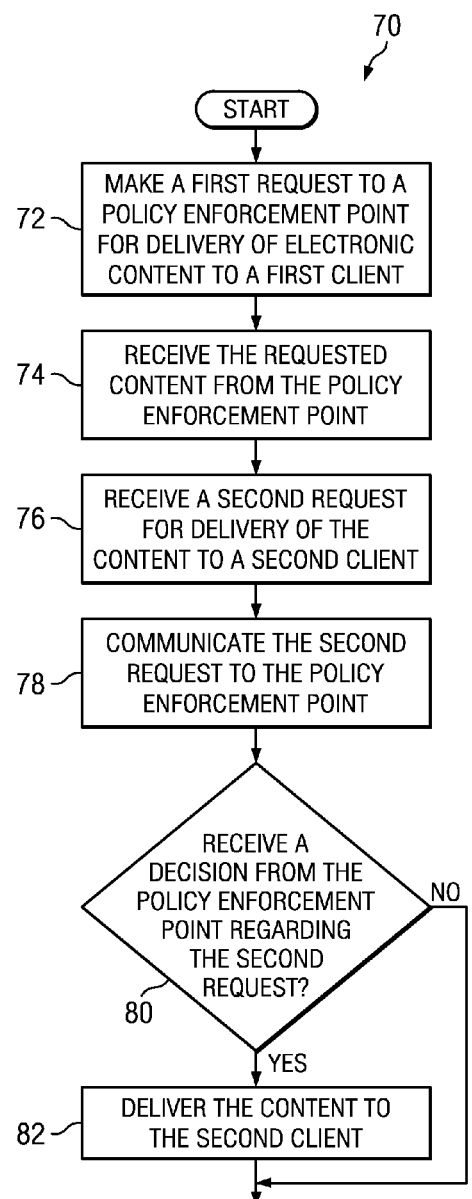
FIG. 5 illustrates a flow chart of an example method for sharing content between clients in a communication network, in accordance with certain embodiments of the present disclosure.

FIG. 5 illustrates a flow chart of an example method 70 for sharing content between clients 30 in a communication network 2, in accordance with certain embodiments of the present disclosure. Method 70 may be performed by a client 30, a server 20, and/or another component, device, and/or feature of communication network 2. In the following section, method 70 may be described as if performed by a first client 30a associated with communication network 2, but that description does not limit the application of the teachings of the present disclosure.

At step 72, first client 30a may make a first request to PEP 23 associated with server 20 for delivery of electronic content to first client 30a. First client 30a may send the first request over a VPN, the Internet, email, and/or any other appropriate communication link with PEP 23. The first request may include any appropriate and/or required data related to first client 30a. As discussed above, the data may include the trust level of first client 30a, integrity information related to first client 30a, etc.

At step 74, first client 30a may receive the requested electronic content from PEP 23 and/or server 20. The requested electronic content may be delivered by any appropriate method and/or system.

At step 76, first client 30a may receive a second request from second client 30b, requesting delivery of the electronic content directly from first client 30a. The second request may include any appropriate and/or required data related to second client 30b. As discussed above, the data may include the trust level of second client 30b, integrity information related to second client 30a, etc.

At step 78, first client 30a may communicate the second request to PEP 23 associated with server 20. First client 30a may add information to the second request. For example the second request may include any appropriate and/or required data related to first client 30a. As discussed above, the data may include the trust level of first client 30a, integrity information related to first client 30a, etc.

At step 80, first client 30a may receive a decision from PEP 23 regarding the second request. If the decision is no, method 70 may end. If the decision is yes, method 70 may proceed to step 82.

At step 82, first client 30*a* may deliver the requested electronic content to second client 30*b*. The requested electronic content may be delivered by any appropriate method and/or system. At the same time, PEP 23 and/or PDP 22 may have imposed one or more conditions on the delivery of the requested electronic content. For example, the use of the electronic content by second client 30*b* may be restricted. As another example, second client 30*b* may be granted a specific and/or limited number of times the electronic content may be accessed. As another example, second client 30*b* may be granted permission to access the requested electronic content only during a predefined period of time. As another example, second client 30*b* may be limited and/or prohibited from delivering the requested electronic content to other clients.

Figure 6:
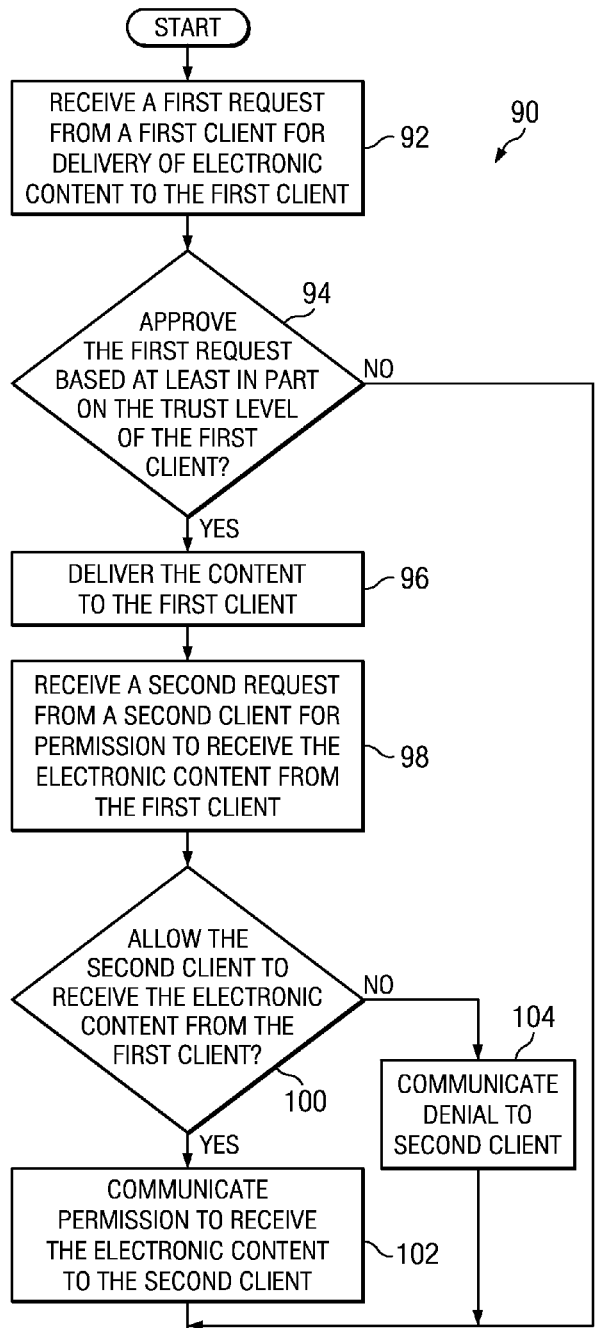
FIG. 6 illustrates a flow chart of an example method for sharing content between clients in a communication network, in accordance with certain embodiments of the present disclosure.

FIG. 6 illustrates a flow chart of an example method 90 for sharing content between clients 30 in a communication network 2, in accordance with certain embodiments of the present disclosure. Method 90 may be performed by a server 20, a PEP 23 associated with a server 20, a PDP 22 associated with a server 20, and/or another component, device, and/or feature of communication network 2. In the following section, method 90 may be described as if performed by PEP 23 and/or PDP 22 associated with server 20, but that description does not limit the application of the teachings of the present disclosure.

At step 92, PEP 23 may receive a first request from a first client 30*a* for delivery of electronic content to the first client 30*a*. PEP 23 may receive the first request over a VPN, the Internet, email, and/or any other appropriate communication link with first client 30*a*.

At step 94, PDP 22 may decide whether to approve the delivery of the electronic content to the first client 30*a* based at least in part on the trust level associated with the first client 30*a*. As described above, communication network 2 may include a trust-based hierarchy assigning various trust levels to clients 30, internal users, and/or other components and/or users of communication network 2. If PDP 22 determines that first client 30*a* is not approved, method 50 may end.

At step 96, PEP 23 may deliver the electronic content to first client 30*a* based on the permission granted by PDP 22. The electronic content may be delivered by any appropriate method.

At step 98, PEP 23 may receive a second request from second client 30*b* requesting permission to receive the electronic content directly from first client 30*a*. The second request may include any appropriate and/or required data related to first client 30*a*, second client 30*b*, or both. As discussed above, the data may include the trust level of each client, integrity information related to either or both, etc.

At step 100, PDP 22 may decide whether to grant permission for second client 30*b* to receive the requested electronic content directly from first client 30*a*. The decision may be based at least in part on the data included in the second request. For example, PDP 22 may base the decision at least in part on the trust level of first client 30*a*, the trust level of second client 30*b* and/or integrity information related to either client 30*a* or 30*b*. If PDP 22 determines the second request is not approved, method 90 may proceed to step 104.

At step 102, PEP 23 may communicate to second client 30*b* that second client 30*b* has permission to receive the requested electronic content from first client 30*a*. At the same time, PEP 23 and/or PDP 22 may impose one or more conditions on the delivery of the requested electronic content. For example, the use of the electronic content by second client 30*b* may be restricted. As another example, second client 30*b* may be granted a specific and/or limited number of times the electronic content may be accessed. As another example, second client 30*b* may be granted permission to access the requested electronic content only during a predefined period of time. As another example, second client 30*b* may be limited and/or prohibited from delivering the requested electronic content to other clients.

At step 104, PEP 23 may communicate to second client 30*b* that it does not have permission to receive the electronic content directly from first client 30*a*. The denial may include alternative sources for the delivery of the requested electronic content. For example, PEP 23 may suggest alternative sources and/or propose that second client 30*b* receive the requested electronic content directly from server 20.

Figure 7:
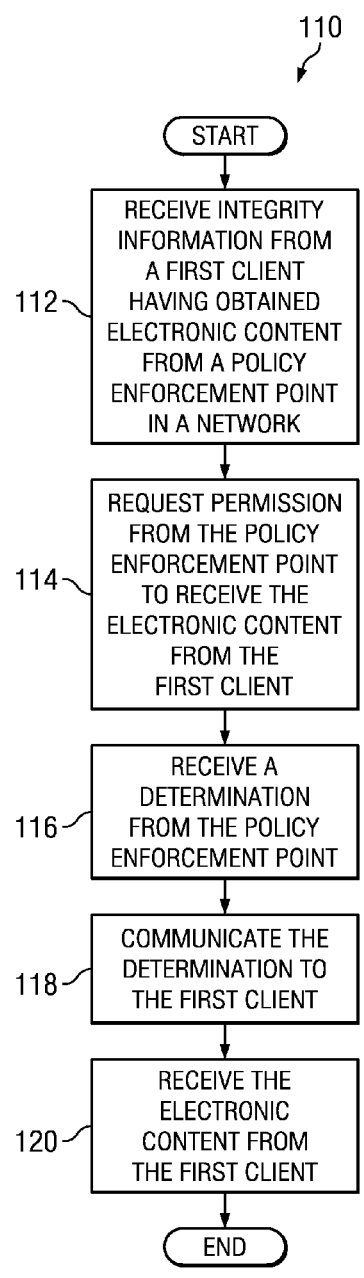
FIG. 7 illustrates a flow chart of an example method for sharing content between clients in a communication network, in accordance with certain embodiments of the present disclosure.

FIG. 7 illustrates a flow chart of an example method 110 for sharing content between clients 30 in a communication network 2, in accordance with certain embodiments of the present disclosure. Method 110 may be performed by a client 30, a server 20, and/or another component, device, and/or feature of communication network 2. In the following section, method 110 may be described as if performed by a second client 30*b* associated with communication network 2, but that description does not limit the application of the teachings of the present disclosure.

At step 112, second client 30*b* may receive integrity information from a first client 30*a*. First client 30*a* may provide the integrity information in response to a request from server 20 and/or second client 30*b*. Second client 30*b* may receive the information over a VPN, the Internet, email, and/or any other appropriate communication link with PEP 23. As discussed above, the integrity information may include the trust level of first client 30*a*. As another example, second client 30*b* may receive information related to electronic content that has been delivered to first client 30*a* from server 20.

At step 114, second client 30*b* may request permission from PEP 23 associated with server 20 to receive the electronic content directly from first client 30*a*. The request may include any appropriate and/or required data related to first client 30*a* and/or second client 30*b*. As discussed above, the data may include the trust level of first client 30*a*, the trust level of second client 30*b*, integrity information related to first client 30*a*, integrity information related to second client 30*b*, etc.

At step 116, second client 30*b* may receive a decision from PEP 23 regarding the second request. If the decision is no, method 110 may end. If the decision is yes, method 110 may proceed to step 118. At the same time, PEP 23 and/or PDP 22 may have imposed one or more conditions on the delivery of the requested electronic content. For example, the use of the electronic content by second client 30*b* may be restricted. As another example, second client 30*b* may be granted a specific and/or limited number of times the electronic content may be accessed. As another example, second client 30*b* may be granted permission to access the requested electronic content only during a predefined period of time. As another example, second client 30*b* may be limited and/or prohibited from delivering the requested electronic content to other clients.

At step 118, second client 30*b* may communicate the determination to first client 30*a*.

At step 120, second client 30*b* may receive the requested electronic content from first client 30*a*. The requested electronic content may be delivered by any appropriate method and/or system.

Although FIGS. 4-7 represent a particular number of steps to be taken with respect to methods 50, 70, 90, and 110, methods 50, 70, 90, and/or 110 may be executed with more or fewer steps than those depicted. Using the methods and systems disclosed herein, certain problems associated with maintaining secure access to electronic content may be improved, reduced, or eliminated. For example, the methods and system disclosed herein allow for distribution of electronic content without recurring use of the network connection directly to server 20 and/or storage unit 14.

Although the present invention has been described with several embodiments, various changes and modifications may be suggested to one skilled in the art. It is intended that the present invention encompass such changes and modifications as fall within the scope of the appended claims.

What is claimed is:

1. A method for sharing content between clients at trust levels in a trust hierarchy associated with a network implementing policy-based management, the method comprising:
    receiving a first request from a first client for delivery of content to the first client at a trust level in the trust hierarchy the trust hierarchy comprising at least two levels of trust allowing access to network resources, each progressively higher level in the trust hierarchy allowing additional access to the network resources, the network resources including at least the electronic content;
    approving the delivery of content to the first client at a policy enforcement point in the network based at least in part on the trust level of the first client in the trust hierarchy;
    delivering the content to the first client;
    receiving a second request for permission from the first client allowing the first client to deliver the content to a second client at a trust level in the trust hierarchy, the second request including integrity information about the second client delivered to the first client from the second client, the trust level of the second client at least as trusted as the trust level of the first client, the integrity information comprising at least one of biometric information associated with the second client and the identification of software installed on the second client;
    determining whether to allow the first client to deliver the content to the second client based at least in part on the integrity information about the second client and the trust level of the second client; and
    communicating to the first client the determination of whether the first client may deliver the content to the second client.

2. The method according to claim 1, further comprising the second client sending a third request to the first client for delivery of the content from the first client.

3. The method according to claim 1, further comprising the first client negotiating with the policy enforcement point for permission to deliver the content to the second client.

4. The method according to claim 1, further comprising delivering the content from the first client to the second client.

5. The method according to claim 1, further comprising the second client requesting the content from the first client.

6. The method according to claim 1, further comprising:
    the second client obtaining integrity information regarding the first client; and
    the second client requesting the content from the first client.

7. The method according to claim 1, further comprising:
    the second client obtaining integrity information regarding the first client;
    the second client verifying the integrity information regarding the first client; and
    the second client requesting the content from the first client only after verifying the integrity information regarding the first client.

8. The method according to claim 1, further comprising the first client obtaining the integrity information about the second client.

9. The method according to claim 1, further comprising:
    the first client obtaining the integrity information about the second client; and
    the first client verifying the integrity information about the second client;
    wherein the first client sends the second request for permission only after verifying the integrity information about the second client.

10. The method according to claim 1, further comprising determining at least one limitation on the use of the content by the second client.

11. The method according to claim 1, wherein the first client is associated with a first entity and the second client is associated with a second entity.

12. The method according to claim 1, further comprising:
    receiving a third request for permission from the second client allowing the second client to deliver the electronic content to a third client at the first trust level in the trust hierarchy, the third request including integrity information about the third client;
    determining whether to allow the second client to deliver the electronic content to the third client based at least in part on the integrity information about the third client; and
    communicating to the second client the determination of whether the second client may deliver the content to the third client.

13. A method for sharing content between clients at trust levels in a trust hierarchy associated with a network implementing policy-based management, the method comprising:
    making a first request to a policy enforcement point in the network for delivery of content to a first client, the first request including a trust level of the first client;
    receiving the requested content from the policy enforcement point;
    receiving a second request from a second client for delivery of the content to the second client at a trust level in the trust hierarchy, the second request including integrity information about the second client and the trust level of the second client, the integrity information comprising at least one of biometric information associated with the second client and the identification of software installed on the second client the trust hierarchy comprising at least two levels of trust allowing access to network resources, each progressively higher level in the trust hierarchy allowing additional access to the network resources, the network resources including at least the content, the trust level of the second client being at least as trusted as the trust level of the first client;
    communicating the second request to the policy enforcement point;
    receiving a decision from the policy enforcement point regarding the second request; and
    if the second request is granted, delivering the content to the second client.

14. The method according to claim 13, further comprising the second client sending the second request to the first client.

15. The method according to claim 13, wherein the first client is associated with a first entity and the second client is associated with a second entity.

16. The method according to claim 13, further comprising negotiating with the policy enforcement point for permission to deliver the content to the second client.

17. The method according to claim 13, further comprising:
the second client obtaining integrity information regarding the first client; and
the second client requesting the content from the first client.

18. The method according to claim 13, further comprising:
the second client obtaining integrity information regarding the first client;
the second client verifying the integrity information regarding the first client; and
the second client requesting the content from the first client only after verifying the integrity information regarding the first client.

19. The method according to claim 13, further comprising:
the first client verifying the integrity information about the second client;
wherein the first client communicates the second request only after verifying the integrity information about the second client.

20. The method according to claim 13, wherein the decision from the policy enforcement point includes at least one limitation on the use of the content by the second client.

21. A network system for sharing electronic content among clients at a common trust level in a trust hierarchy, the network system implementing policy-based management, the network system comprising:
a plurality of clients, each client having a respective trust level in the trust hierarchy the trust hierarchy comprising at least two levels of trust allowing access to network resources, each progressively higher level in the trust hierarchy allowing additional access to the network resources, the network resources including at least the electronic content;
a storage unit configured to deliver electronic content to the plurality of clients;
a policy enforcement point in electronic communication with the storage unit and a first one of the plurality of clients, the policy enforcement point configured to receive a first request from the first one of the plurality of clients for the delivery of electronic content from the storage unit; and
a policy decision point in electronic communication with the policy enforcement point, the policy decision point configured to assess the first one of the plurality of clients including assessing at least the trust level of the first one of the plurality of clients and to grant permission to the policy enforcement point to deliver the content from the storage unit to the first one of the plurality of clients;
the policy enforcement point further configured to receive from the first one of the plurality of clients a second request for permission to deliver the electronic content to a second one of the plurality of clients, the second request including at least integrity information associated with the second one of the plurality of clients, the trust level of the second one of the plurality of clients at least as trusted as the trust level of the first one of the plurality of clients, the integrity information comprising at least one of biometric information associated with the second one of the plurality of clients and the identification of software installed on the second one of the plurality of clients; and
the policy decision point further configured to make a policy-based decision whether to allow the first one of the plurality of clients to deliver the electronic content to the second one of the plurality of clients based at least in part on the integrity information associated with the second one of the plurality of clients and the trust level of the second one of the plurality of clients.

* * * * *

UNITED STATES PATENT AND TRADEMARK OFFICE
CERTIFICATE OF CORRECTION

| | | |
|---|---|---|
| PATENT NO. | : 8,726,335 B2 | Page 1 of 1 |
| APPLICATION NO. | : 12/824275 | |
| DATED | : May 13, 2014 | |
| INVENTOR(S) | : Seigo Kotani et al. | |

It is certified that error appears in the above-identified patent and that said Letters Patent is hereby corrected as shown below:

On the title page, item (75) Inventors:

Before "Matsuguchi" delete "Masaaski" and insert --Masaaki--.

Signed and Sealed this
Fourteenth Day of October, 2014

Michelle K. Lee
*Deputy Director of the United States Patent and Trademark Office*